(12) United States Patent
McConathy et al.

(10) Patent No.: US 9,521,513 B2
(45) Date of Patent: Dec. 13, 2016

(54) METHOD AND SYSTEM OF ZONE SUSPENSION IN ELECTRONIC MONITORING

(71) Applicant: Nathaniel McConathy, Lexington, KY (US)

(72) Inventors: Nathaniel McConathy, Lexington, KY (US); Brian C. Poe, Lexington, KY (US); Jason Gilbert, Versailles, KY (US)

(73) Assignee: Earthsweep LLC, Cincinnati, OH (US)

( * ) Notice: Subject to any disclaimer, the term of this patent is extended or adjusted under 35 U.S.C. 154(b) by 61 days.

(21) Appl. No.: 14/519,217

(22) Filed: Oct. 21, 2014

(65) Prior Publication Data

US 2016/0112835 A1 Apr. 21, 2016

(51) Int. Cl.
*H04W 4/02* (2009.01)
*G06Q 50/26* (2012.01)

(52) U.S. Cl.
CPC ........... *H04W 4/021* (2013.01); *G06Q 50/265* (2013.01)

(58) Field of Classification Search
CPC .............................. H04W 4/021; G06Q 50/265
See application file for complete search history.

(56) References Cited

U.S. PATENT DOCUMENTS

| | | |
|---|---|---|
| 5,043,736 A | 8/1991 | Darnell et al. |
| 5,266,944 A | 11/1993 | Carroll et al. |
| 5,298,884 A | 3/1994 | Gilmore et al. |
| 5,369,699 A | 11/1994 | Page et al. |
| 5,396,227 A | 3/1995 | Carroll et al. |
| 5,461,390 A | 10/1995 | Hoshen |
| 5,537,102 A | 7/1996 | Pinnow |
| 5,661,458 A | 8/1997 | Page et al. |
| 5,731,757 A | 3/1998 | Layson, Jr. |
| 5,867,103 A | 2/1999 | Taylor, Jr. |
| 5,892,447 A | 4/1999 | Wilkenson |
| 5,959,533 A | 9/1999 | Layson, Jr. |
| 5,982,281 A | 11/1999 | Layson, Jr. |
| 6,014,080 A | 1/2000 | Layson, Jr. |
| 6,044,257 A | 3/2000 | Boling et al. |
| 6,072,396 A | 6/2000 | Gaukel |
| 6,100,806 A | 8/2000 | Gaukel |
| 6,130,620 A | 10/2000 | Pinnow et al. |
| 6,160,481 A | 12/2000 | Taylor, Jr. |
| D440,954 S | 4/2001 | Boling et al. |
| 6,226,510 B1 | 5/2001 | Boling et al. |

(Continued)

FOREIGN PATENT DOCUMENTS

WO WO 2008/143379 11/2008

OTHER PUBLICATIONS

International Search Report and Written Opinion dated Apr. 5, 2013 for Application No. PCT/US2012/071513.

(Continued)

*Primary Examiner* — Kashif Siddiqui
(74) *Attorney, Agent, or Firm* — Fish & Richardson P.C.

(57) ABSTRACT

A tracking device and system are described where a location data collector device to receive location data of the tracking device and one or more communication devices that send the location data to a central facility and that receives a defined location package that includes location information where the tracking device is placed in either a suspension or active tracking mode.

25 Claims, 7 Drawing Sheets

(56) References Cited

U.S. PATENT DOCUMENTS

| | | |
|---|---|---|
| 6,285,867 B1 | 9/2001 | Boling et al. |
| 6,337,665 B1 | 1/2002 | Gaukel |
| 6,366,538 B1 | 4/2002 | Anderson et al. |
| 6,405,213 B1 | 6/2002 | Layson et al. |
| 6,606,304 B1 | 8/2003 | Grinter et al. |
| 6,636,732 B1 | 10/2003 | Boling et al. |
| 6,639,516 B1 | 10/2003 | Copley |
| 6,646,617 B1 | 11/2003 | Gaukel |
| 6,703,936 B2 | 3/2004 | Hill et al. |
| 6,774,797 B2 | 8/2004 | Freathy et al. |
| 6,774,799 B2 | 8/2004 | Defant et al. |
| 6,844,816 B1 | 1/2005 | Melton et al. |
| 6,853,304 B2 | 2/2005 | Reisman et al. |
| 6,972,684 B2 | 12/2005 | Copley |
| 6,992,581 B2 | 1/2006 | Reisman et al. |
| 6,992,582 B2 | 1/2006 | Hill et al. |
| 6,998,985 B2 | 2/2006 | Reisman et al. |
| 7,015,817 B2 | 3/2006 | Copley et al. |
| 7,064,670 B2 | 6/2006 | Galperin et al. |
| 7,072,668 B2 | 7/2006 | Chou |
| 7,092,695 B1 | 8/2006 | Boling et al. |
| 7,098,795 B2 | 8/2006 | Adamczyk et al. |
| 7,119,695 B2 | 10/2006 | Defant et al. |
| 7,123,141 B2 | 10/2006 | Contestabile |
| 7,205,890 B2 | 4/2007 | Defant et al. |
| 7,251,471 B2 | 7/2007 | Boling et al. |
| RE39,909 E | 11/2007 | Taylor, Jr. |
| 7,317,377 B2 | 1/2008 | Galperin et al. |
| 7,330,122 B2 | 2/2008 | Derrick et al. |
| 7,382,268 B2 | 6/2008 | Hartman |
| D578,918 S | 10/2008 | Aninye |
| 7,446,656 B2 | 11/2008 | Blakeway |
| 7,456,355 B2 | 11/2008 | Blakeway |
| 7,489,249 B2 | 2/2009 | Better et al. |
| 7,518,500 B2 | 4/2009 | Aninye et al. |
| 7,545,318 B2 | 6/2009 | Derrick et al. |
| 7,619,513 B2 | 11/2009 | Hill et al. |
| 7,630,724 B2 | 12/2009 | Beyer, Jr. et al. |
| 7,636,047 B1 | 12/2009 | Sempek |
| 7,701,171 B2 | 4/2010 | Defant et al. |
| 7,737,841 B2 | 6/2010 | Derrick et al. |
| 7,804,412 B2 | 9/2010 | Derrick et al. |
| 7,864,047 B2 | 1/2011 | Aninye et al. |
| 7,930,927 B2 | 4/2011 | Cooper et al. |
| 7,936,262 B2 | 5/2011 | Derrick et al. |
| 7,961,092 B2 | 6/2011 | Freathy et al. |
| 7,984,540 B2 | 7/2011 | Blakeway |
| 8,009,036 B2 | 8/2011 | Freathy et al. |
| 8,013,736 B2 | 9/2011 | Derrick et al. |
| 8,031,077 B2 | 10/2011 | Derrick et al. |
| 8,232,876 B2 | 7/2012 | Derrick et al. |
| 8,395,513 B2 | 3/2013 | Moran et al. |
| 8,682,356 B2 | 3/2014 | Poe et al. |
| 8,810,454 B2* | 8/2014 | Cosman ............... H04W 64/00 342/451 |
| 2007/0038338 A1 | 2/2007 | Larschan et al. |
| 2007/0139207 A1 | 6/2007 | Agapi et al. |
| 2008/0012760 A1* | 1/2008 | Derrick ................... G07C 1/20 342/357.74 |
| 2008/0088438 A1 | 4/2008 | Aninye et al. |
| 2008/0096521 A1 | 4/2008 | Boling et al. |
| 2008/0108370 A1 | 5/2008 | Aninye |
| 2008/0316022 A1 | 12/2008 | Buck et al. |
| 2010/0066545 A1 | 3/2010 | Ghazarian |
| 2010/0090825 A1 | 4/2010 | Freathy |
| 2010/0090827 A1 | 4/2010 | Gehrke et al. |
| 2010/0123589 A1 | 5/2010 | Buck et al. |
| 2010/0240969 A1 | 9/2010 | Rompa et al. |
| 2011/0133928 A1 | 6/2011 | Buck et al. |
| 2011/0133937 A1 | 6/2011 | Buck et al. |
| 2011/0195722 A1 | 8/2011 | Walter et al. |
| 2011/0234397 A1 | 9/2011 | Fetzer et al. |
| 2011/0248853 A1 | 10/2011 | Roper et al. |
| 2012/0056744 A1 | 3/2012 | Gemer |
| 2013/0006066 A1 | 1/2013 | Melton |
| 2013/0045753 A1* | 2/2013 | Obermeyer ........ G08B 21/0277 455/456.1 |
| 2013/0093627 A1* | 4/2013 | Cosman ............... H04W 64/00 342/451 |

OTHER PUBLICATIONS

Screenshot, 3M Electronic Monitoring, Domestic Violence Proximity Notification System, 2011. Accessed May 22, 2013 http://solutions.3m.com/3MContentRetrievalAPI/BlobServlet?lmd=1316545433000&locale=en_WW&assetType=MMM_Image&assetId=1273695271401&blobAttribute=ImageFile.

Screenshot, Oakland County Michigan, Community Corrections, Electronic Monitoring Devices, 2012. Accessed May 22, 2013 http://www.oakgov.com/commcorr/Pages/program_service/electronic_monitor.aspx.

Utterback's Utterings, Satellite Tracking of People LLC, Stalker Alert, Feb. 1, 2011. Accessed May 22, 2013 http://www.utterbacksutterings.com/category/domestic-violence/.

* cited by examiner

```
                   ┌─────────────────────────────┐
                   │ authorities define one or   │
                   │ more zones where tracking   │
                   │ of an offender is not       │
                   │ necessary, 62               │
                   └──────────────┬──────────────┘
                                  │
                   ┌──────────────┴──────────────┐
                   │ provide offender with a     │
                   │ plan that delineates        │
                   │ certain areas where the     │
                   │ offender needs to be        │
                   │ present at specific times,  │
                   │ 64                          │
                   └──────────────┬──────────────┘
                                  │
                   ┌──────────────┴──────────────┐
                   │ presented a user interface  │
                   │ to input address of a       │
                   │ facility, and days or dates │
                   │ and or times where the user │
                   │ is authorized to be         │
                   │ present, 66                 │
                   └──────────────┬──────────────┘
                                  │
                   ┌──────────────┴──────────────┐
                   │ input compliance            │
                   │ requirements to suspend, 72 │
                   └──────────────┬──────────────┘
                                  │
                   ┌──────────────┴──────────────┐
                   │ central monitoring system   │
                   │ processes inputs to produce │
                   │ a defined location package, │
                   │ 74                          │
                   └─────────────────────────────┘
```

FIG. 3

FIG. 4

- determine ranges of GPS data that correspond to physical location where tracking will be suspended, 74a
- Add to package days and times 74b
- add compliance requirements 74c
- combine to produce defined location package for suspend zone 74d

65

65a

65b

Offender information _____ ID _____

Facility information

Address _____

Days _____

Time from _____ to _____

Requirements to suspend
    Substance tracking device ◉
    Tracking device 10 ◉
    Alarms ◉
    Devices within tracking device 10 ◉

65c submit 65d

FIG. 3A

METHOD AND SYSTEM OF ZONE SUSPENSION IN ELECTRONIC MONITORING

BACKGROUND

This disclosure relates generally to the field of electronic monitoring using a portable electronic device.

Current systems that track the geographical location of portable electronic devices make extensive use of cellular networks to transmit Global Positioning System (GPS) data to a remote central database. Tracking is extremely important in law enforcement such as to ensure compliance with lawful orders and constraints on persons' movements and locations such as in monitoring the location of those individuals within the criminal justice system that can pose substantial risks to public safety. In addition, tracking is also extremely important in asset tracking and travel tracking such as by vehicle, boat, and air.

SUMMARY

When an offender is being monitored via electronic monitoring there are situations where it is not desirable to collect data about the offender's location/activities and or to assert alarms from monitoring of other compliance devices. Situations include when an offender is in a work release program where offenders are allowed into the community during the day to work, but report back to a secure facility for the evening. Other situations include a juvenile offender during times that reports to school where a tracking device may not be allowed in the classroom, but where the juvenile is under the supervision of school authorities during the school day. Therefore, in some situations (e.g., locations) it is not always desirable to monitor and/or to assertion alarms in those situations. In addition, there are situations where suspending tracking or some aspects of tracking will conserve battery power in the tracking device. This is especially a consideration due to the various communication components present in some tracking devices.

The technology disclosed herein can be used to implement machines, methods and articles of manufacture.

According to an aspect a tracking device system includes a storage device configured to store location data collected by a location data collector associated with a tracking device, a processor and memory configure to retrieve a set of location data of the tracking device, determine from the set of location data whether the tracking device is in one of one or more defined zones, and configuring the processor to, at least partially suspend tracking according to a first determination that the tracking device is in the one or more defined zones, and continue tracking according to a second, different determination that the tracking device is not in the one or more defined zones.

According to an additional aspect, a tracking system includes a central monitoring facility that stores data from plural tracking devices, the central monitoring facility comprising a processor and memory and is configured to download to a tracking device data that defines one or more tracking suspension zones to configure a processor in the tracking device to at least partially suspend tracking when the tracking device is in one of the one or more defined zones, receive a set of location data from the tracking device, detect that the tracking device suspended sending location data to the central monitoring facility, determine from the received location data whether the tracking device system is in one of the one or more suspend zones; and when the tracking device is in one of the one or more zones, record that the tracking device is in a suspend tracking zone; and when the tracking device is not in one of the one or more zones, record a tracking violation by the tracking device.

According to an additional aspect, a tracking method includes storing location data from plural tracking devices, in a central monitoring facility that comprises a processor and memory and computer storage, downloading to a first tracking device of the plural tracking devices, data that defines one or more tracking suspension zones for the tracking device, downloading to the first tracking device instructions to configure a processor in the tracking device to at least partially suspend tracking when the tracking device is in one of the one or more defined zones, receiving location data from the tracking device, detecting that the tracking device has suspended sending location data, determining from the received location data whether the tracking device system is in one of the one or more suspend zones; and when in one of the one or more zones, recording in a database in the central facility that the tracking device was in a suspend tracking zone when the central monitoring facility detected that the tracking device suspended sending data; and when the tracking device not in one of the one or more zones, record in a database in the central facility that the tracking device incurred a tracking violation.

According to an additional aspect, a tracking device include a location data collector device to receive location data of the tracking device, one or more communication devices that send the location data to a central facility and that receives a defined location package that includes location information where the tracking device is placed in either a suspension or active tracking mode, a processor and memory in communication with the processor, the processor configured to store location data collected by the location data collector device, configure the processor to at least partially suspend tracking when the processor determines that tracking device is in a suspension zone determined from comparing the location information in the defined location package to location data receive from the location data collector device, cause the tracking device to suspend sending location data to the central monitoring facility based on determining from the received location data and the location information in the defined location package that the tracking device system is in the suspension zone and record that the tracking device was in the suspension zone when sending of data was suspended.

The following are some of the features within some of the above aspects.

The tracking system is a tracking device and a housing being a smartphone housing or an ankle monitor housing, the housing holding a set of components that include a location data collector configured to collect location data and at least one transceiver for transmission of location data to a remote device. The defined zones are defined as zones to suspend tracking with areas outside the zones being areas to continue tracking. The defined zones are defined as zones to continue tracking with areas outside the zones being areas to suspend tracking. The transceiver is selected from a peer-to-peer transceiver; a cellular transceiver and a satellite transceiver. The tracking system is a central server system having a database, which is configured to receive the collected location data. The location data collector is a system configured to collect terrestrial based location data or GPS based location data or non-GPS based satellite location data, and the system is configured to determine location of the system according to the collected data. The processor is configured to track compliance with plural requirements and the tracking device communicates compliance with a central database. The processor is configured to suspend tracking of compliance with some but not all of the plural requirements according to the location of the tracking device. The tracking device is wireless tethered to a second device that monitors compliance with other requirements, and the processor is configure to suspend compliance with requirement of the second device according to the first determination that the tracking device is in the one or more defined suspension zones.

One of more of the aspects may provide one or more of the following advantages.

Monitoring of an offender using an electronic monitoring device is automatically suspended based on the offender's location/activities and in some instances time and/or day of the week. Situations when it would not be desirable to track an offender are programmed based on an offender's tracking device location or location/date and time. Such situations are identified by location and location/time/date so as to suspend assertion of alarms while in those locations. In addition, such situations where suspension of tracking or some aspects of tracking can occur will conserve battery power in the tracking device. This is especially a consideration due to the various communication components that may be present in the tracking device.

The details of one or more embodiments of the invention are set forth in the accompanying drawings and the description below. Other features, objects, and advantages of the invention will be apparent from the description and drawings, and from the claims.

BRIEF DESCRIPTIONS OF THE DRAWINGS

The drawings and detailed descriptions which follow are intended to be illustrative and are not intended to imply limitations on the scope of potential implementations of the disclosure set forth herein.

FIGS. 3-5 and 7 are flow charts of exemplary processes for tracking the tracking device.

FIG. 3A is an exemplary user interface.

DETAILED DESCRIPTION

Described is a location detection/suspension process for tracking a location of a tracking device using location data such as Global Positioning System (GPS) location data and for automatic suspension of tracking according to device situations. A remote central monitoring system includes a database that collects location data according to an identification of a tracking device that includes a GPS transceiver. The remote central monitoring system can automatically suspend tracking when a user wearing/carrying the device is within certain situations, where the situations are predefined to the remote central monitoring system.

Figure 1:
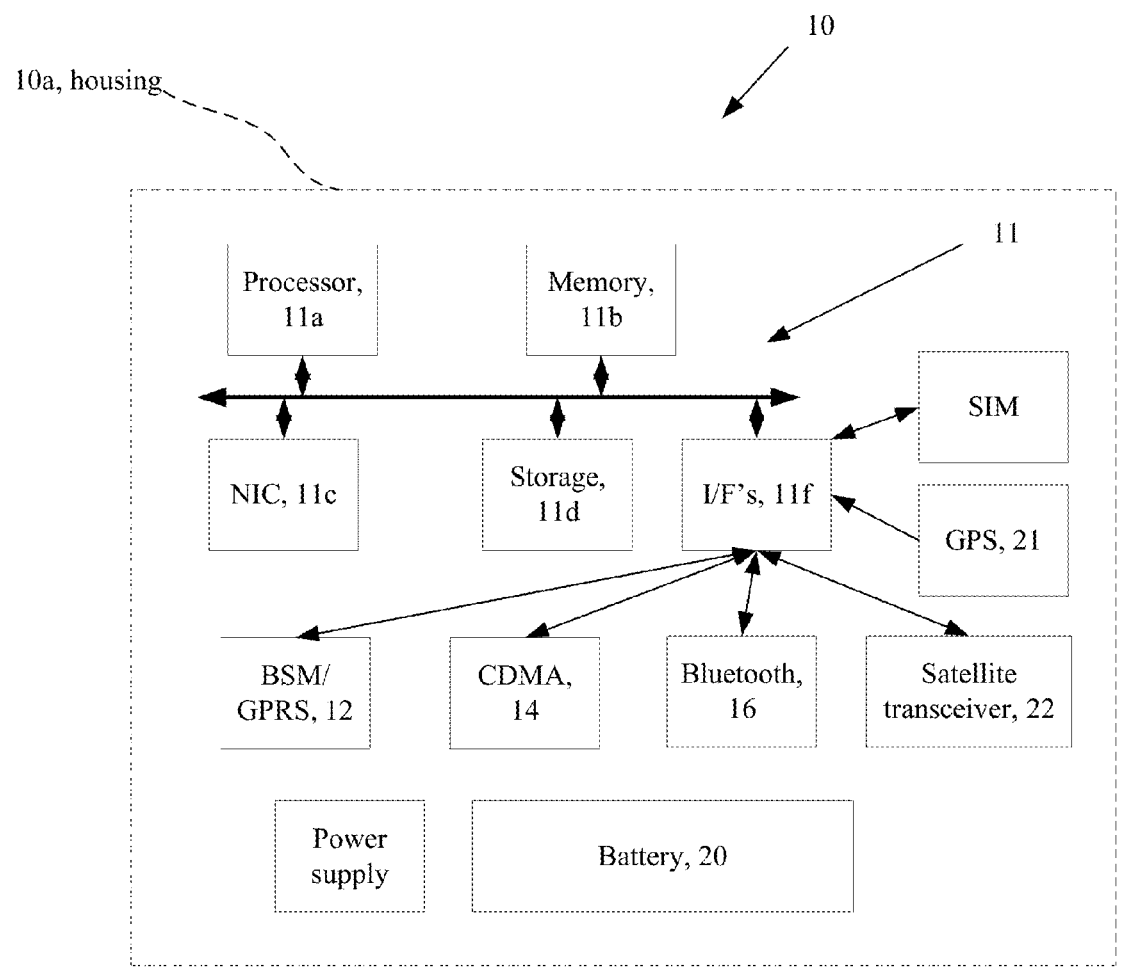
FIG. 1 is a block diagram of an exemplary tracking device.

Referring to FIG. 1, an embodiment of a tracking device 10 is shown. The tracking device 10 includes a housing 10a and processor module 11. The processor module 11 includes a processor 11a and memory 11b, storage 11d, and interfaces 11f. The processor module also can include a network interface 11c. The tracking device also includes mobile communication devices including a GSM/GPRS device 12, where GSM is the Global System for Mobile Communications standard developed by the European Telecommunications Standards Institute (ETSI) and GPRS is the General packet radio service standard that is a packet oriented mobile data service. Also included are a CDMA device 14, where CDMA is Code Division Multiple Access and a Bluetooth® transceiver 16 for peer to peer communications. In addition the tracking device 10 includes a Subscriber Identity Module (SIM) card 18, a battery 20, a location data collector configured to collect location data of the tracking device, such as a GPS (Global Positioning System) receiver 21, and a satellite transceiver 22. The tracking device 10 shown is exemplary. Other tracking devices that have but one communication mechanism could be used that is various configurations of tracking devices can include one or all the mobile communication devices 12 and 14 with or without the satellite transceiver 22.

Figure 2:
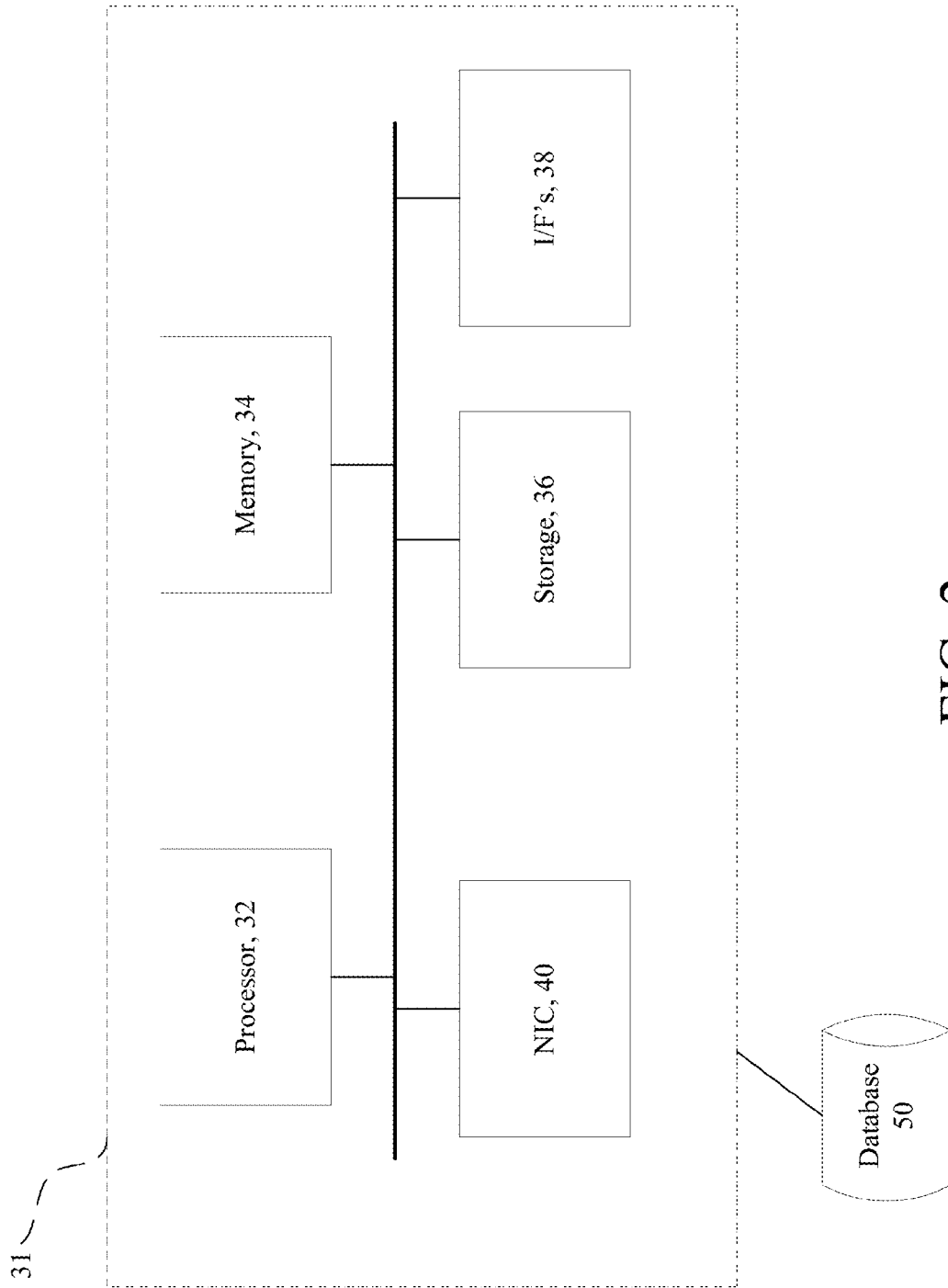
FIG. 2 is a block diagram of an exemplary central processing system including a server system for tracking the tracking device.

Referring now to FIG. 2, an exemplary high-level schematic of view of a central monitoring system 30 that includes a server computer system 31 and database 50 is shown. The GPS receiver 21 on the device 10 (FIG. 1) collects GPS location data from satellites and the device 10 sends via one of the mobile communication devices 12, 14 such data to the server 31 system for storage in the database 50. The server computer system 31 includes a processor 32, memory 34, storage 36, various interfaces (e.g., display, user interfaces, etc.) 38 a network interface 40 and can be of various configurations using various operating systems, etc. The collected GPS data are transmitted, e.g., via a cellular network or the like back to the server 31 that monitors locations of the device 10. The database 50 stores data in physical storage either locally or remotely. The database 50 can be accessed via systems on a network to either add to or retrieve from location data for a specific purpose.

Initially GPS data is collected from satellites orbiting the earth by the GPS chip 12 in the tracking device 10. The collected data is stored locally on the tracking device 10 that collected the GPS data. In some embodiments, the tracking device 10 will attempt to analyze the data and send results of analysis on the collected GPS data to the central monitoring system for storage in the database 50, whereas in other embodiments, the tracking device 10 will attempt to establish communication with the central monitoring system 30 via a cellular and/or satellite network and send the data to the central monitoring system 30 where the server 31 will analyze the data. The tracking device can also maintain a local store of the location data along with time/date, etc.

Various mechanisms for establishing connections are disclosed in the above co-pending application. Once the connection is acquired, the tracking device 10 will send the collected and/or results of analysis on the collected GPS data to the server 31 at the central monitoring system 30.

The central monitoring system 30 includes the server 31 system in communication with the device of FIG. 1, and at least one transceiver configured to receive location data from plural remote devices. The server 31 comprising processor and memory can be configured to retrieve a set of location data corresponding to the tracking device 10 and apply a process to the set of location data to determine from data points in the set whether a point corresponds to a suspend zone. The database 50 is configured to store the location data according to an identification of the device of FIG. 1, e.g., using the SIM module and/or other approaches.

Referring now to FIG. 3 an exemplary suspend zone defining process 60 to define suspend zones is shown. The suspend zone defining process 60 is typically executed by the server 31 in the central monitoring system 30, but in some embodiments can be executed by the tracking device 10 or other systems under control of authorities that are monitoring the user of the tracking device 10. Generally authorities define 62 one or more zones where tracking of an offender is not necessary. These zones can be defined for all offenders within a given jurisdiction or can be defined on a per offender basis. Discussed will be an implementation where the zones are defined on a per offender basis.

For a given offender, the authorities will provide such offender with a plan 64 that will delineate certain areas where the offender needs to be present at specific times and/or dates or days of the week. For example, assume that an offender is in a work release program at a specified facility on certain days, e.g., Mondays and Wednesdays and is in an educational facility on Thursdays and Fridays, all at specified times. On those days at those times, the user need not be tracked provide that the offender is within the suspend zone, as the facility defined by the suspend zone has effective control and monitoring of the user, whereas at other times and other days the user is tracked.

In some implementations, the authorities are presented 66 with a user interface that allows the authorities to input the address of the facility, and in some implementations, input the days or dates where the user is authorized to be present at that facility and the times where the user is at that facility. The authorities also input 72 what compliance requirements are to be suspended. For example, if another device that measures drug/alcohol compliance is in communication with the tracking device 10, in the suspend zones this tracking can be suspended and the other device placed in a sleep mode. Other compliance requirements that can be suspended are alarms that are asserted when the tracking device 10 is out of communication range with the central monitoring system 30, e.g., which could be triggered within a facility when a communication link is lost. In addition, while in these zones that tracking device 10 can be placed in a low utilization (sleep mode) state that turns off much of the circuitry within the device, causing the device to enter a sleep mode. In most embodiments, the GPS receiver will remain active and when it receives new GPS data can cause the tracking device 10 to fully wake up. The data inputted into the user interface is processed 74, e.g., by the central monitoring system 30, e.g., in server 31, to produce a defined location package where tracking will be suspended.

Referring now to FIG. 3A an exemplary interface 65 is shown for inputting zone suspend data into the database 50 for an offender. The interface 65 includes fields for entering offender ID 65*a*, facility information 65*b*, e.g., address, (optionally name), days (or dates or date ranges) and times of the day. Also included are controls 65*c* that are used to indicate what requirements to suspend while at the address at the specified times, as well as a submit control 65*d*.

Referring now to FIG. 4, one technique to define a location package has the central monitoring system 30 determine 74*a* ranges of GPS data that correspond to each physical location where tracking will be suspended for instance address information inputted into the database 50, via the interface. The technique can use an interface and starts with either an address or an arbitrary point. The user specifies on the interface a circular or polygonal zone that defines the shape of the area, and the user can supply an extent that expands the shape selected. Thus, a supervisor types in an address, makes a circular zone and specifies an extent that is the radius of that zone. For more difficult cases (especially long buildings, or L shaped buildings) where the necessary circle would allow too much area of freedom then the user will select a point on the building, and then drag points to define the outline of the building, and finally specify an extent which grows the polygon to allow a small buffer around the building. The extent of the zone is converted using well-known techniques into a set of GPS range data.

In some implementations, the defined location package produced by the central monitoring system 30 also includes in addition to the GPS range data, other data such as the days and times 74*b* that the suspended tracking would be valid for the GPS range data and the compliance requirements 74*c* that are suspended within the GPS range data, and parameters for causing the tracking device 10 to enter a sleep mode, and so forth. These elements are combined 74*d* to produce the defined location package for the suspend zone.

In the example above, the central monitoring system 30 produces two defined location packages one for the work release program facility and the other for the educational facility.

Figure 5:
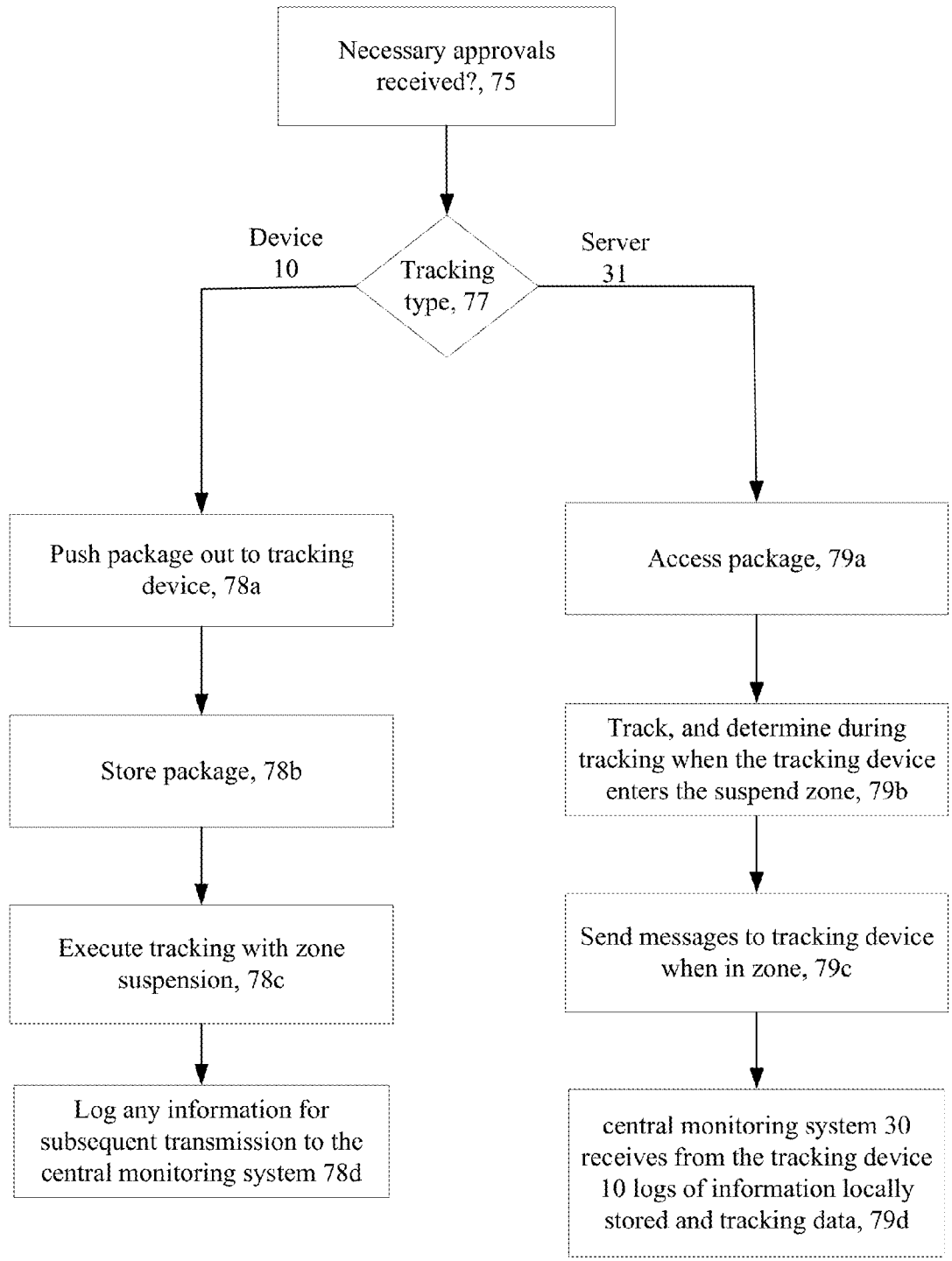

Referring now to FIG. 5, once the packages are produced and have received any necessary administrative review/approvals, (if any) 75 these packages processed according to the tracking type 77. For example, in some implementations, the packages are push out 78*a* to the particular tracking device 10, which stores 78*b* the package, and executes the package by configuring the tracking application on the tracking device 10 to perform tracking with zone suspension according to the package 78*c*. The tracking device 10 stores 78*d* the package(s) and is configured 80 to determine entry into a suspend zone. The tracking device 10 suspends tracking, as appropriate while in the zone, according to the package, and logs any information locally for subsequent upload to the database 50.

In situations where the central monitoring system 30 is configured to determine entry into a suspend zone, the central monitoring system 30 accesses 79*a* the suspend location package for a tracking device 10 and executes 79*b* processing of GPS data sent from the tracking device 10 to determine during tracking of the tracking device 10, when the tracking device 10 has entered the suspend zone. The central monitoring system 30 will send 79*c* messages to the tracking device 10 to cause the device to suspend certain tracking/monitoring while in the suspend zone and resume the suspended tracking/monitoring while outside the suspend zone. The central monitoring system 30 receives 79*d* from the tracking device 10 any logs of information locally stored to store in the database 50, as well as tracking data once the device leaves the suspend zone.

In addition, these packages are saved by the central monitoring system 30 in the database 50, for subsequent monitoring, editing, and possible use with other tracking devices 10 for other offenders.

Figure 6:
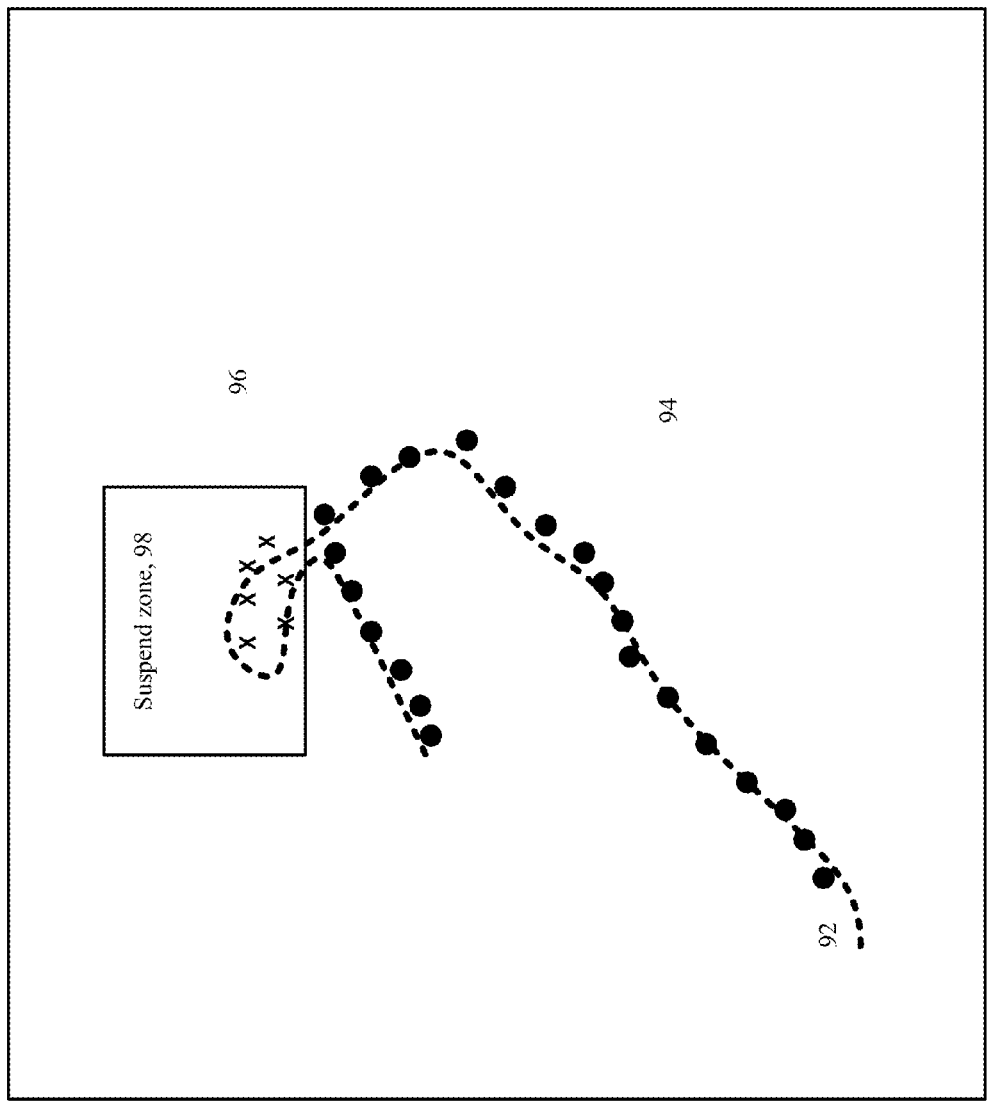
FIG. 6 is a diagram useful in understanding tracking processes of FIG. 7.

Referring now to FIG. 6, a generic map 90 that depicts a series of points 94 (GPS data locations represented as solid dots) lying in a path 92 taken by a user (not shown) wearing the tracking device 10 is shown. The travel path 92 as captured in GPS data may deviate somewhat from the actual path taken by the user due to GPS errors. The actual path and the GPS path takes a course about an area, including within a defined area that is configured by the server 31 as a suspend zone 98. The suspension zone 98 is represented as GPS points (lower case x's) that fall within the defined zone 98. Often these points in the suspension zone 98 (represented as lower x's) may not be monitored by the central database and tracked by the tracking device 10, as the points could be within a building.

Thus, as shown in FIG. 6, at tracking points denoted by the solid dots the monitored offender is outside of the suspend zone 98. During time covered by the solid dots, the tracking device 10 carried by the offender is fully tracking the offender's movements and the central monitoring facility is receiving data to fully monitor the offender to determine whether all relevant requirements are being enforced. At tracking points denoted by the lower case x's the monitored offender's tracking device has entered the suspend zone 98. At tracking point denoted by the lower case x's, the offender is inside the suspend zone 98 and the offender's tracking device will only monitor none or only a subset of the requirements and will suspend sending data to the central monitoring facility. As the path resumes to solid dots the offender's device is outside of the suspend zone 98 and the offender is automatically fully monitored again and continues until the device again enters a suspend zone.

Figure 7:
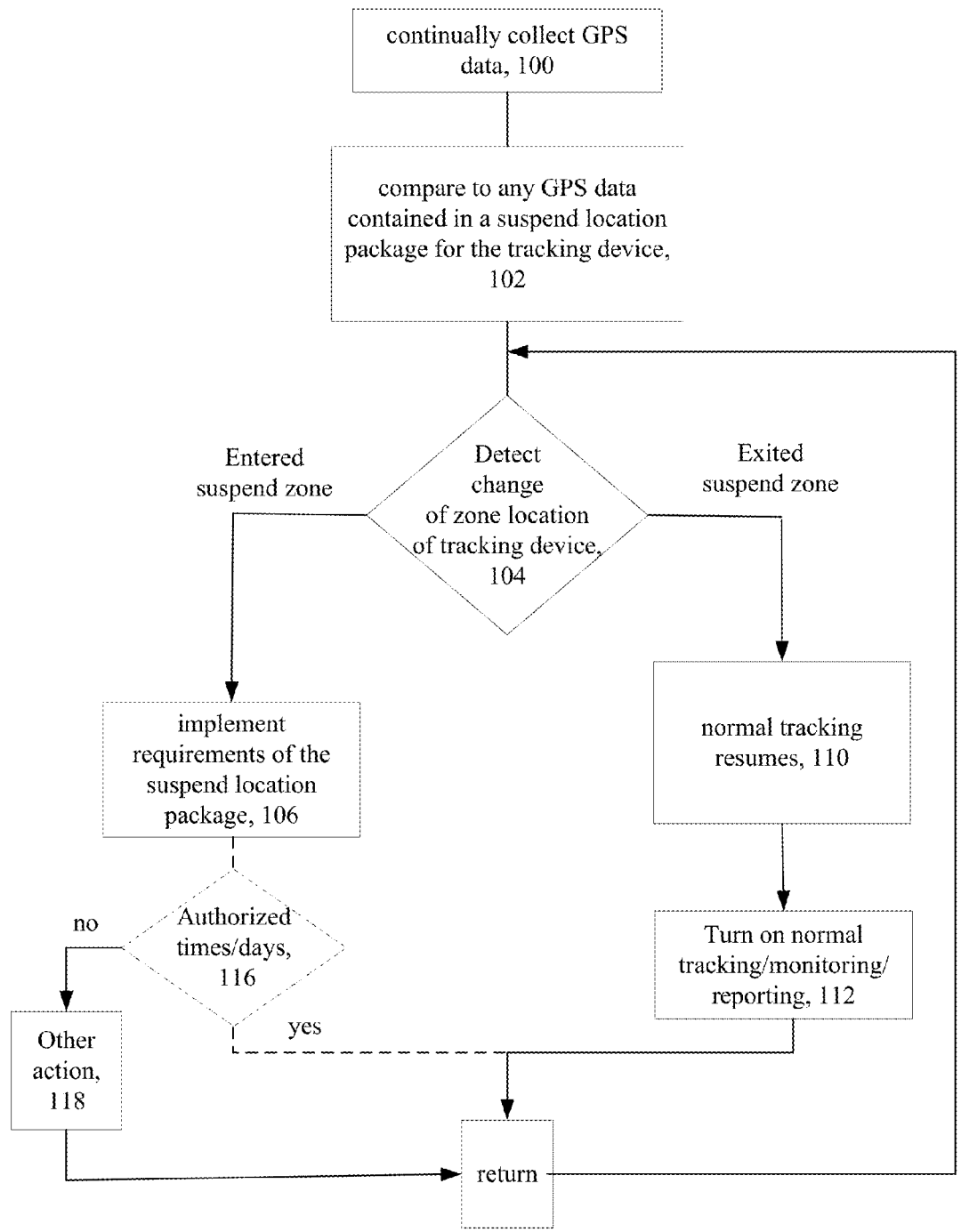

Referring now to FIG. 7, the GPS data is continually collected 100 by the tracking device 10 and compared 102 to any GPS data that is contained within any suspend location package for the tracking device 10. This comparison 102 can be performed either by the central monitoring system 30 and/or the tracking device 10 (as mention in conjunction with FIG. 5). In either event, the central monitoring system 30 or the tracking device 10 examines the GPS data to detect 104 a change of zones, e.g., that the tracking device 10 has entered a suspend zone or has exited a suspend zone. When the process detects 104 that the tracking device 10 has entered a suspend zone the process implements 106 the requirements of the suspend location package by turning off or putting to sleep, any devices and/or processes, as defined by the package.

Once either the particular tracking device 10 or the central monitoring system 30 determines 108 that the tracking device 10 has exited a suspend zone, normal tracking 110 by the central monitoring system 30 and the tracking device 10 resumes. Resumption of normal tracking will cause 112 the package to turn on all tracking/monitoring functions and alarms including those suspended while in the suspend zone. The tracking device 10 and/or the central monitoring system 30 executes the detecting processing 104 to determine during tracking when the tracking device 10 re-enters the suspend zone or another suspend tracking zone according to suspend tracking packages produced for the tracking device 10.

In addition to this location tracking, the tracking device and/or central monitoring system 30 in some implementations determines 116 whether the tracking device 10 is in the suspend zone at authorized times/days, to cause the device to suspend certain tracking/monitoring while in the suspend zone and resume the suspended tracking/monitoring while outside the suspend zone. With this tracking if the tracking device and/or central monitoring system 30 determines that the tracking device is in the suspend zone in inappropriate times/days it can raise 118 an alarm or record a violation condition, according to the plan, and returns to monitoring for a detected change of zone location, 104.

While FIG. 1 depicted a device which included both a GSM/GPRS chip 12 and a CDMA chip 14, in many cases, devices implemented using the disclosed technology could have only a single cellular transceiver (i.e., a separate GSM device or GPRS device or a CDMA device 14, but not each), or might be equipped with neither a GSM/GPRS device 12 or a CDMA chip 14 (e.g., they could rely entirely on satellite networks, or some other channel for communication).

The devices 10 can be any sort of computing device. For example, the devices can be a mobile device, a desktop computer, a laptop, a cell phone, a personal digital assistant ("PDA"), a server 31, an embedded computing system, a special purpose computing device, a signal processor device, and so forth. One particular implementation is as an ankle bracelet monitor that is worn by the user.

Server 31 can be any of a variety of computing devices capable of receiving information, such as a server 31, a distributed computing system, a desktop computer, a laptop, a cell phone, a rack-mounted server 31, and so forth. Server 31 may be a single server 31 or a group of server 31s that are at a same location or at different locations.

Server 31 can receive information from client device user device via interfaces. Interfaces can be any type of interface capable of receiving information over a network, such as an Ethernet interface, a wireless networking interface, a fiber-optic networking interface, a modem, and so forth. Server 31 also includes a processor and memory. A bus system (not shown), including, for example, a data bus and a motherboard, can be used to establish and to control data communication between the components of server 31.

Processor may include one or more microprocessors. Generally, processor may include any appropriate processor and/or logic that is capable of receiving and storing data, and of communicating over a network (not shown). Storage can include a hard drive and a memory whether volatile or non-volatile random access memory devices, such as a dynamic random access memory, and machine-readable media or other types of storage which are non-transitory machine-readable storage devices. Components also include a storage device, which is configured to store information, code, etc.

Embodiments can be implemented in digital electronic circuitry, or in computer hardware, firmware, software, or in combinations thereof. Embodiments can also involve pipelining of various computational stages. Apparatus of the invention can be implemented in a computer program product tangibly embodied or stored in a machine-readable storage device and/or machine readable media for execution by a programmable processor; and method actions can be performed by a programmable processor executing a program of instructions to perform functions and operations of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention.

For example for simplicity of explanation, the disclosure describes determination of suspend zones and production of suspend zone packages. In this implementation, normal tracking is suspended in the suspend zones and normal tracking resumes outside the suspend zones.

However, these techniques can be used for determination of area where tracking is necessary. Thus rather than determination of suspend zones and suspend zone packages the principles can be used for determination of tracking zones and tracking zone packages, with normal tracking being required within the zones and suspended outside the tracking zones. This type of required normal tracking within tracking zones could especially be used for situations where there is a restraining order against a person to prohibit that person being in certain areas, and yet will not require tracking of the individual in other areas.

Accordingly, other embodiments are within the scope of the following claims.

What is claimed is:

1. A tracking system, the system comprising:
   a storage device configured to store location data collected by a location data collector associated with a tracking device;
   a processor device; and
   memory coupled to the processor, with the tracking system configured to:
      retrieve a location data package including one or more geographically defined zones, with the location data package including ranges of location data that correspond to the one or more geographically defined zones, and temporal data associated with at least one of the one or more geographically defined zones;
      retrieve a set of location data received from the tracking device;
      determine from the retrieved set of location data and the retrieved location data package whether the tracking device is in one of the one or more defined zones; and
      at least partially suspend tracking according to a determination that the tracking device is in the one of the one or more defined zones and according to current temporal data compared to the associated temporal data.

2. The system of claim 1 wherein the tracking system is a tracking device and comprises:
   a housing being a smartphone housing or an ankle monitor housing, the housing holding a set of components that comprise:
   a location data collector configured to collect location data; and
   at least one transceiver for transmission of location data to a remote device, with the at least one transceiver selected from a peer-to-peer transceiver, a cellular transceiver, and a satellite transceiver.

3. The system of claim 1 wherein the defined zones are defined as zones to suspend tracking with areas outside the zones being areas to continue tracking.

4. The system of claim 1 wherein the defined zones are defined as zones to continue tracking with areas outside the zones being areas to suspend tracking.

5. The system of claim 1 wherein the retrieved location data package is defined according to a user of the tracking device and associated temporal data is an indication of a specified time/day for the tracking device to be in the one of the one or more defined zones.

6. The system of claim 1 wherein the tracking system is a central server system having a database that stores the collected location data and the central server system is further configured to:
   continue tracking according to a determination that the tracking device is not in the one or more defined zones.

7. The system of claim 1 wherein the location data collector is a system configured to collect terrestrial based location data or GPS based location data or non-GPS based satellite location data, and the system is configured to determine the location of the system according to the collected data.

8. The system of claim 1 wherein the processor is configured to track compliance with plural requirements and the tracking device communicates compliance with a central database.

9. A tracking system comprises:
   a storage device configured to store location data collected by a location data collector associated with a tracking device, the location data collector is a system configured to collect terrestrial based location data or GPS based location data or non-GPS based satellite location data;
   a processor and memory configured to:
      retrieve a set of location data of the tracking device;
      determine according to the collected data whether the tracking device is in one of one or more defined zones;
      at least partially suspend tracking according to the determination that the tracking device is in the one of the one or more defined zones;
      continue tracking according to a second, different determination that the tracking device is not in the one of the one or more defined zones;
      track compliance with plural requirements that the tracking device communicates compliance with to a central database; and
      suspend tracking of compliance for some but not all of the plural requirements according to the location of the tracking device.

10. The system of claim 1 wherein the tracking device is wirelessly coupled to a second device that monitors compliance with the plural requirements, and the processor is configure to suspend a determination of compliance with the plural requirements according to the determination that the tracking device is in the one or more defined suspension zones.

11. A tracking system comprises:
   a central monitoring server system that stores data from plural tracking devices, the central monitoring server system comprising a processor and memory and is configured to:
   download to a tracking device data that defines one or more tracking suspension zones to configure a processor in the tracking device to at least partially suspend tracking when the tracking device is in one of the one or more defined zones;
   receive a set of location data from the tracking device;
   detect that the tracking device suspended sending location data to the central monitoring facility;

determine from the received location data whether the tracking device system is in one of the one or more suspend zones; and
when the tracking device is in one of the one or more zones record that the tracking device is in a suspend tracking zone or when the tracking device is not in one of the one or more zones record a tracking violation by the tracking device.

12. The system of claim 11 wherein the location data is global positioning satellite (GPS) location data.

13. The system of claim 11 wherein the tracking device is configured to track compliance with plural requirements and the central monitoring server system receives communications of compliance from the tracking device.

14. The system of claim 13 wherein the central monitoring server system is configured to suspend tracking of compliance with some but not all of the plural requirements according to the location of the tracking device.

15. The system of claim 13 wherein the central monitoring server system includes a database.

16. The system of claim 11 wherein the central monitoring server system further comprises a database configured to store location data according to an identification of the tracking device.

17. A tracking method comprises:
storing location data from plural tracking devices, in a central monitoring facility that comprises a processor and memory and computer storage;
transferring to a first tracking device of the plural tracking devices, data that defines one or more tracking suspension zones for the tracking device;
transferring to the first tracking device instructions to configure a processor in the tracking device to at least partially suspend tracking when the tracking device is in one of the one or more defined zones;
receiving location data from the tracking device;
detecting that the tracking device has suspended sending location data;
determining from the received location data whether the tracking device is in one of the one or more tracking suspension zones; and when the tracking device is in one of the one or more tracking suspension zones recording in a database in the central facility that the tracking device was in the one tracking suspension zone.

18. The method of claim 17 wherein the tracking device is configured to track compliance with plural requirements and the central monitoring facility receives communications of compliance from the tracking device.

19. The method of claim 18 wherein the central monitoring is configured to suspend tracking of compliance with at least some of the plural requirements according to the location of the tracking device.

20. A tracking device comprises:
a location data collector device to receive location data of the tracking device;
one or more communication devices that send the location data to a central facility and that receives a defined location package that includes location information where the tracking device is placed in either a suspension or active tracking mode;
a processor and memory in communication with the processor, the processor configured to:
store location data collected by the location data collector device;
at least partially suspend tracking when the processor determines that tracking device is in a suspension zone determined from comparing the location information in the defined location package to location data receive from the location data collector device;
cause the tracking device to suspend sending location data to the central monitoring facility based on determining from the received location data and the location information in the defined location package that the tracking device system is in the suspension zone; and
record that the tracking device was in the suspension zone when sending of data was suspended.

21. The tracking device of claim 20 wherein when the tracking device is not in the suspension zone, the processor is configured to:
send location data collected by the location data collector device to a central monitoring facility.

22. The tracking device of claim 20 wherein the defined location package further includes data that defines days and times that suspended tracking in the zone is valid and compliance requirements that are suspended within zone, and parameters for causing the tracking device to enter and exit from a sleep mode.

23. The tracking device of claim 22 wherein the tracking device is configured to track compliance with plural requirements contained in the defined location package and the tracking device sends communications of compliance to the central monitoring facility.

24. The tracking device of claim 20 wherein the location data collector device is a global positioning satellite (GPS) location data collector device.

25. The method of claim 17 wherein when the central monitoring facility detected that the tracking device suspended sending data and that the tracking device was not in one of the one or more zones, the method further comprises:
recording in the database in the central facility that the tracking device incurred a tracking violation.

* * * * *